Nov. 1, 1960
C. W. VOGT
2,958,168
FORMING AND FILLING CONTAINERS
Filed May 19, 1959
3 Sheets-Sheet 2
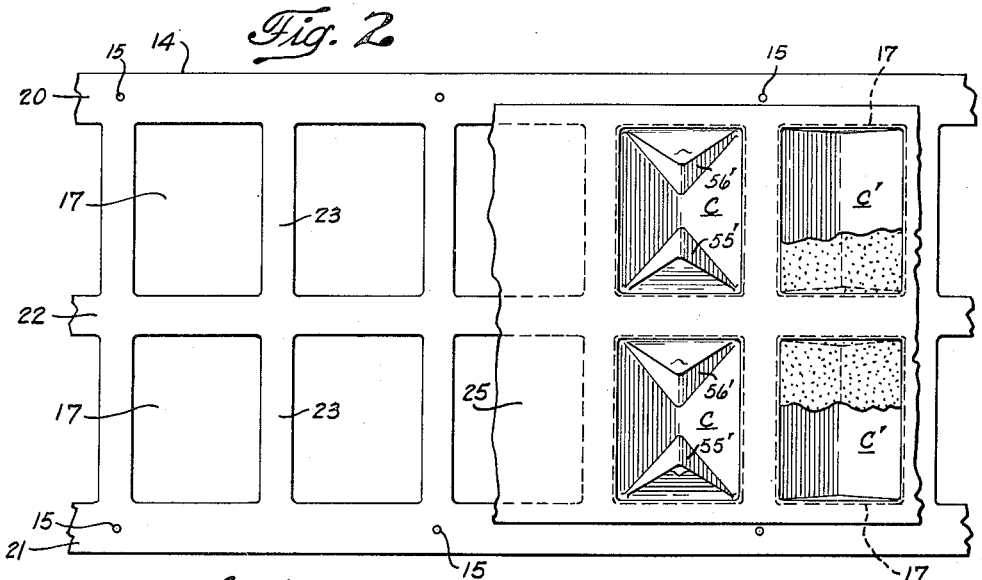
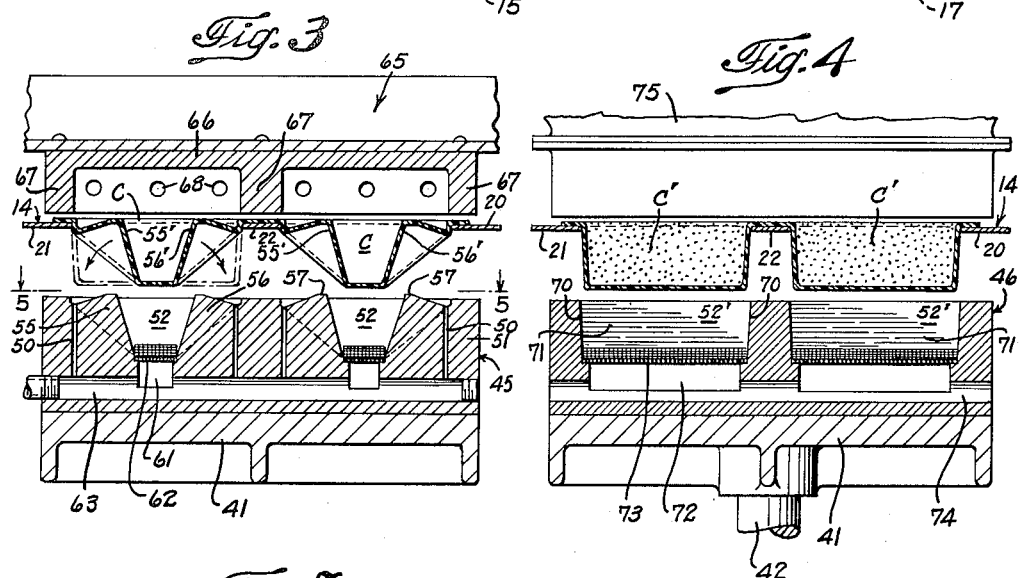
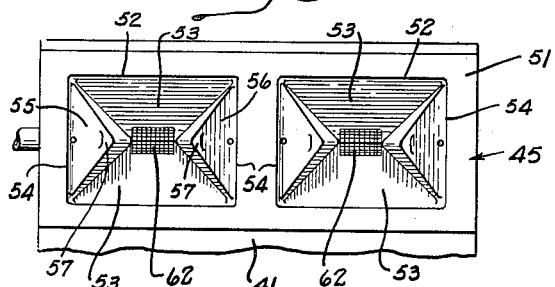
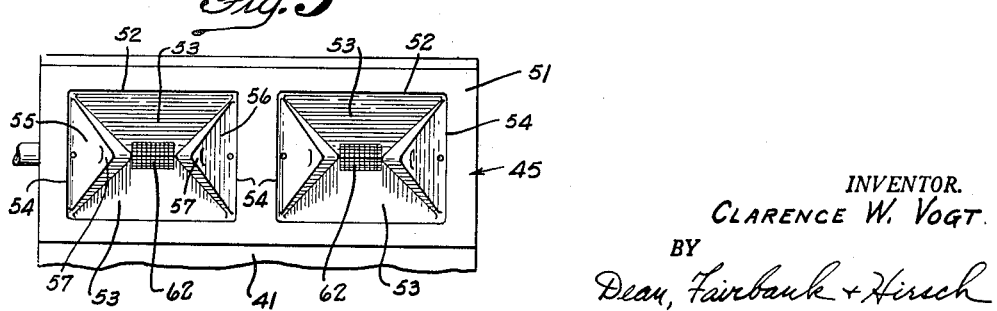
INVENTOR.
CLARENCE W. VOGT.
BY
Dean, Fairbank + Hirsch
ATTORNEYS.

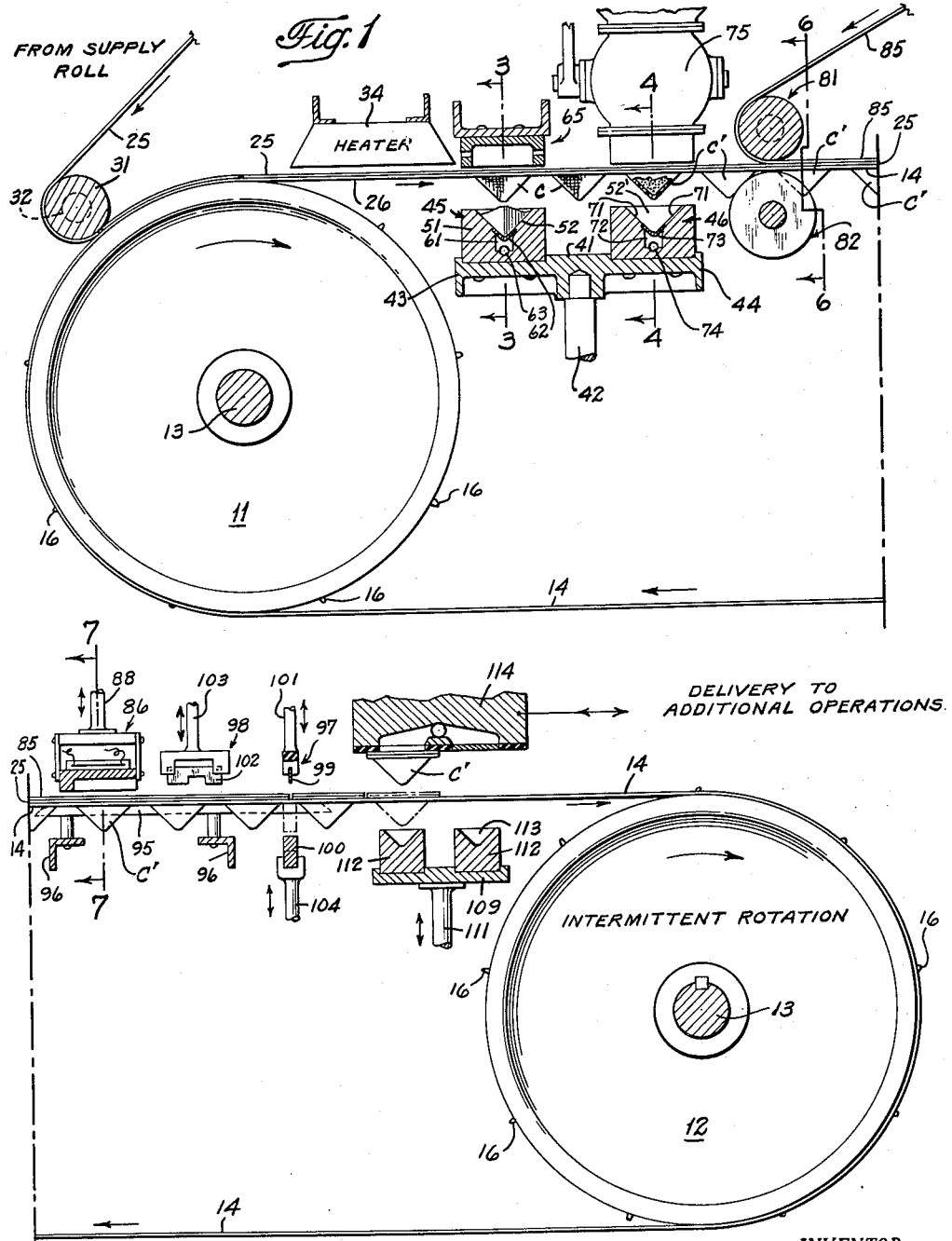

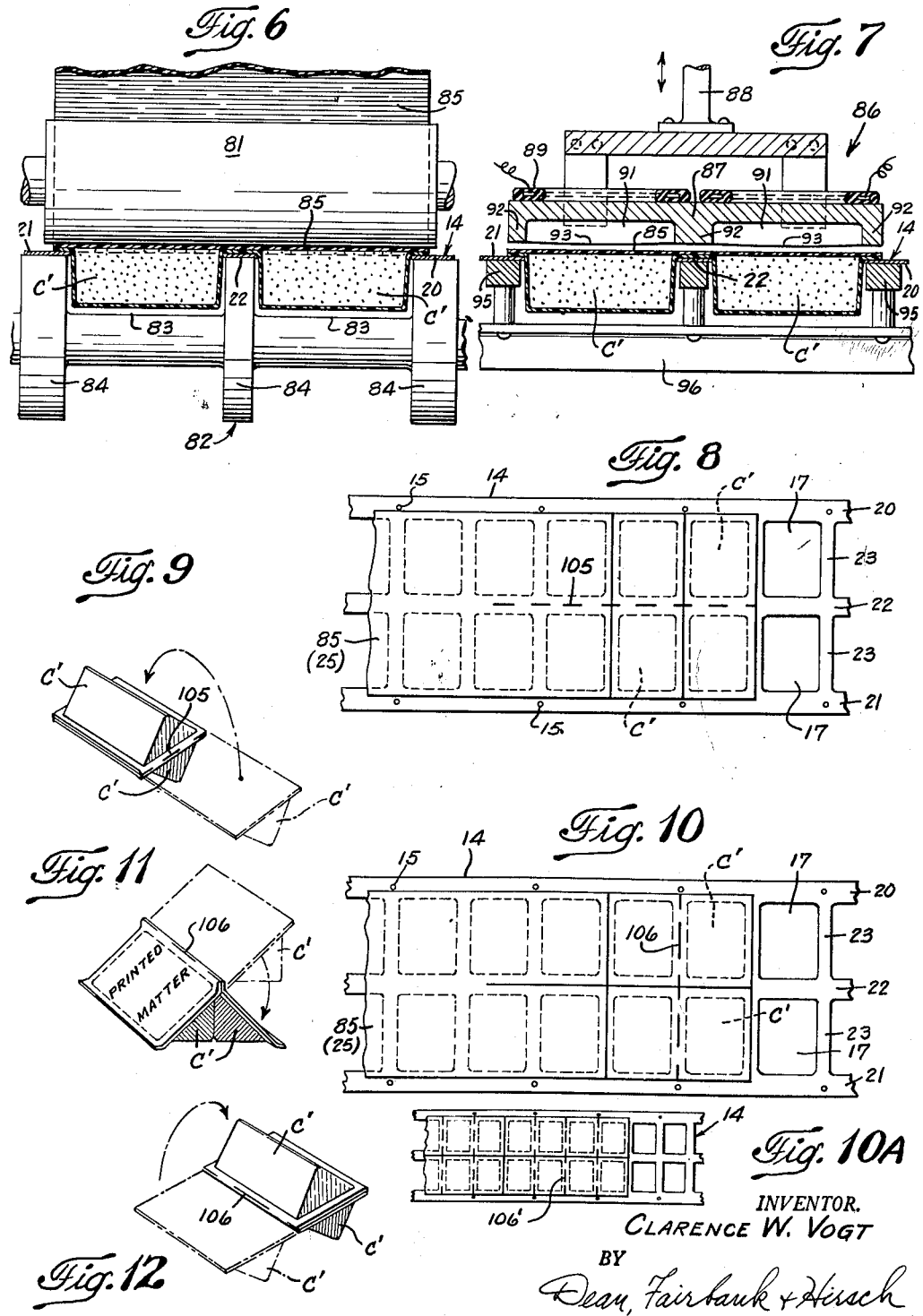

United States Patent Office 2,958,168
Patented Nov. 1, 1960

2,958,168

FORMING AND FILLING CONTAINERS

Clarence W. Vogt, Weston, Conn.
(Box 232, Westport, Conn.)

Filed May 19, 1959, Ser. No. 814,240

13 Claims. (Cl. 53—30)

This invention relates to a method and equipment for forming and filling containers more particularly of relatively thin, film-like thermoplastic material.

As conducive to an understanding of the invention, it is to be noted that when containers are made from relatively thin, film-like themoplastic material such as polyethylene, by clamping the periphery of a sheet of such material around the periphery of a mold cavity corresponding to the contour of the container to be formed, and then causing the sheet to stretch and conform itself to the contour of such cavity, the entire stretching action takes place in the unclamped area.

Due to this fact, the sheet stretches substantially in proportion to the unsupported length of the sheet, that is, as portions of the sheet come into contact with the mold, they cease to stretch, while the remainder of the sheet continues to stretch, so that those portions which must be displaced the greater distance are stretched to the greatest extent. For this reason, when the containers are made by pressure or stretch-forming operations, the corner portions of the containers are stretched the most and are the thinnest and the weakest.

To reinforce the areas of the container most susceptible to abrasion and damage, i.e., the corner portions thereof, I have provided a method of producing containers from thermoplastic or stretchable sheet material, as shown and described in my copending application, Serial No. 658,300 filed May 10, 1957, in which the corner portions of the container can be made thicker and stronger than their walls so that the package made from such a container is rendered much more durable and resistant to impact and abrasion, yet using thinner gauge film.

The container formed as shown in said patent application Serial No. 658,300 prior to filling, comprises a cavity substantially triangular in cross-section, having inwardly inclined side walls and end walls, and re-entrant corner portions extending into said cavity at the junctions of said side and end walls, said corner portions being displaceable outwardly to increase the capacity of said container.

Where the initial container cavity with re-entrant corners as above described, is formed in a web in one operation and later positioned over a mold having a prism-like cavity therein of dimensions such that when the corner portions of the initial container cavity are displaced outwardly, the entire wall surfaces of the initial container cavity will be supported, such support will be provided only if the mold and the initial container cavity with the re-entrant corners are exactly aligned. If such alignment is not provided, then when such corner positions are displaced outwardly, the final container cavity will be irregular in shape and hence unsatisfactory.

It is accordingly among the objects of the invention to provide a relatively simple method and correspondingly simple equipment for forming in a web of thermoplastic material, cavities with re-entrant corner portions of the type shown in said patent application and for displacing said corner portions into a mold cavity that is substantially exactly aligned with the web cavity having such re-entrant corners, so that a final container cavity of the desired configuration will be formed.

Another object is to provide a method and equipment of the above type whereby container cavities of the above type may be formed and filled and readily juxtaposed to form rectangular packages to minimize storage and shipping space.

According to the invention these objects are accomplished by the arrangement and combination of elements hereinafter described and more particularly recited in the claims.

This application is a continuation-in-part of co-pending application Serial No. 801,869, filed March 25, 1959.

In the accompanying drawings in which are shown one or more of various possible embodiments of the several features of the invention.

Figs. 1 and 1A are diagrammatic side elevational views of the equipment,

Fig. 2 is a fragmentary plan view of the supporting belt for the containers,

Fig. 3 is a transverse sectional view taken along line 3—3 of Fig. 1,

Fig. 4 is a view similar to Fig. 3 taken along line 4—4 of Fig. 1,

Fig. 5 is a plan view taken along line 5—5 of Fig. 3,

Fig. 6 is a sectional view taken along line 6—6 of Fig. 1,

Fig. 7 is a view similar to Fig. 6 taken along line 7—7 of Fig. 1A,

Figs. 8, 10 and 10A are plan views of the supporting belt for the container, showing the webs severed to form a composite package of different types, and Figs. 9, 11 and 12 are perspective views of different types of composite packages that can be assembled from the containers formed by the equipment.

Referring now to the drawings, as shown in Figs. 1 and 1A, the equipment comprises a pair of spaced pulleys or rollers 11 and 12, each mounted on a horizontal shaft 13, said rollers being encompassed by an endless belt 14 and being driven by a suitable motor (not shown) to advance said belt in the direction indicated by the arrows.

The belt 14 is preferably formed from a thin sheet of flexible material such as steel and has a plurality of spaced holes 15 along each of its side edges, which coact with complementary outstanding pins 16 on the pulleys 11 and 12 to ensure positive advance of said belt by said pulleys.

As shown in Fig. 2, for example, the belt 14 has a plurality of rows of spaced rectangular apertures 17 therethrough extending longitudinally thereof. Although two rows are illustratively shown, it is to be understood that more or less could be provided.

As shown in Fig. 2, the apertures 17 define longitudinal strips 20, 21 along each of the side edges of the belt, a longitudinal strip 22 between adjacent transversely aligned pairs of apertures 17 and transverse strips 23 between adjacent apertures, said strips defining a frame around each aperture.

Means are provided to apply a web 25 of thermoplastic material on top of the upper run 26 of said belt 14. To this end, as shown in Fig. 1, a pressure roller 31 is provided rotatably mounted on a horizontal shaft 32, and located so that it will press against the periphery of pulley 11. The roller 31 which may be of resilient material, is of length slightly less than the transverse spacing between the pins 16 of pulley 11 and the width of the web 25 is substantially the same as that of the roller 31 so that it will clear said pins 16.

As shown in Fig. 1, the web 25 which is drawn from a suitable supply roll (not shown) is positioned between the roller 31 and the pulley 11 to be advanced by rotation of the latter.

Means are provided to soften the web 25 of thermoplastic material so that it may readily be formed into a container cavity in the manner hereinafter to be described.

To this end, as shown in Fig. 1, a heating unit 34 is provided positioned directly over the upper run 26 of the belt 14 adjacent the pulley 11 and extending transversely across the belt slightly spaced from the latter, so that as the web 25 is advanced beneath the heating unit 34, it will be softened thereby.

Means are provided to form a cavity in such softened web 25 and to fill such cavity.

To this end, as shown in Figs. 1 and 3, a rectangular plate 41 is provided positioned beneath the upper run 26 of belt 14 and mounted on a plunger 42 which may be reciprocated in any suitable manner to raise and lower the plate 41.

As shown in Fig. 3, the plate 41 is of width substantially equal to that of the belt 14 and of length slightly greater than the width of three of said apertures, including the transverse strips 23 associated therewith.

Mounted on the plate 41 and rising therefrom adjacent each of the ends 43, 44 thereof are spaced molds 45, 46.

The mold 45 which is of the type used to form the containers shown in my co-pending application Serial No. 658,300, filed May 10, 1957, comprises a rectangular block 51 which illustratively has two longitudinally aligned spaced cavities 52 therein.

Each of the cavities has downwardly converging side walls 53 and end walls 54. Portions of each of the side and end walls 53, 54 are directed inwardly to form re-entrant corner portions 55, 56 of pyramidal (three-sided) shape, extending into each cavity and preferably having their apices 57, slightly flat and lying in a plane slightly above the plane of the mouth of the cavity.

The cavities 52 in the molds 45 thus are substantially prism-like in contour and the bottom of each cavity has an aperture 61, closed by a substantially V-shaped porous plate 62, illustratively of sintered metal, and which is in communication with a bore 63 extending through the mold 45.

In addition small diameter bores 50 extend through the corner portions 55, 56 into the bore 63 to permit application of suction to the upper end areas of the cavities.

Positioned over the belt 14 vertically aligned with said mold 45 is a clamp member 65 which, as shown in Figs. 1 and 3, comprises an elongated plate 66 of length and width substantially the same as that of the mold 45. The plate 66 has depending ribs 67 extending the length thereof and transversely thereacross which are designed to coact with the mouth portions of the mold 45 extending laterally of the cavities 52 therein, said ribs being vented as at 68.

The mold 46 is similar in outward configuration to the mold 45 and also has two cavities 52' therein. However, as shown in Figs. 1, 2 and 4, the cavities 52' are prism-like in contour being substantially triangular in cross-section with substantially parallel end walls 70.

The bottom of each cavity 52' at the junction of the inwardly inclined side walls 71 thereof has an elongated aperture 72 closed by a substantially V-shaped porous plate 73, also illustratively of sintered metal and which is in communication with a bore 74 extending through the mold 46.

Positioned over the belt 14 vertically aligned with the cavities in the mold 46 is a filling head 75 which may be of the type disclosed, for example, in any of my co-pending applications Serial No. 585,775 filed May 18, 1956, Serial No. 594,152 filed June 27, 1956, Serial No. 595,249, filed July 2, 1956, Serial No. 743,041, filed June 19, 1958, and Serial No. 776,308, filed November 25, 1958, by means of which a charge of pulverulent or finely-divided material, is blown by means of gas under pressure into a container cavity formed in the manner to be described.

With the equipment thus far described, as the belt 14 is advanced by the pulleys 11 and 12, the web 25 of thermoplastic material will be drawn from the supply roll by the pulley 11 and roller 31, and as such web is advanced beneath the heater 34 it will be softened.

With further advance of the web, apertures 17 of the belt 14, spanned by the softened portion of the web which is supported by the belt 14 therebeneath, will be positioned between the clamp member 65 and the forming mold 45.

At this time movement of the belt 14 is stopped and the plate 41 is lifted by its plunger 42 to move the mold 45 against the undersurface of the belt with the cavities 52 in said mold 45 aligned with the transversely aligned apertures 17 in the belt.

Thus the softened web portion will be clamped between the belt 14 and the depending ribs 67 of the clamp member 65 with the softened portion of the web spanning said apertures 17 and the mouth of the mold cavities 52.

Thereupon suction is applied to the mold cavities 52 through bore 63, aperture 61 and porous member 62, and also through bores 50 to the portion of the web over the corner portion 55, 56 so that said softened portion of the web will be drawn into the cavities 52 to assume a configuration complementary thereto.

Thus as shown in Fig. 2, there will be initially formed in the web open-mouth cavities C each of which is substantially triangular in cross section, having reentrant corner portions extending into the cavity which are substantially pyramidal in shape with slightly flat apices and which are displaceable outwardly to render the interior of the cavity prism-like in shape.

After the web cavities C are thus formed, the mold 45 is moved downwardly by downward movement of the plate 41 and the belt 14 is advanced a distance sufficient to align another heated and softened web portion with the mold 45 and clamp member 65 and the forming operation previously described is repeated.

With another step advance of the belt, the aperture 17 containing cavities C first formed in the web, will have been moved into alignment with the mold 46 and the filling head 75.

Thereupon when the plate 41 is lifted for formation of web cavities by the mold 45, the mold 46 will be exactly aligned with the web cavities C first formed and will move the frame-like area of the belt around the periphery of said web cavities against the outlet of the filling head to form a dependable seal.

The filling head is then actuated in manner described in said co-pending patent applications, to force a charge of pulverulent material or the like into the web cavities C. As a result, the re-entrant corner portions 55', 56' of such initial web cavities C will be displaced outwardly to form final cavities C' that conform to the contour of the prismlike cavities in mold 46, the air in said mold being vented through porous member 73, aperture 72 and bore 74.

Inasmuch as the periphery of the cavity C initially formed in the web by the mold 45 will be supported by the belt 14 and will be transported by said belt into exact alignment with the cavity 52' in the mold 46, there is assurance that when such web cavity is filled and its re-entrant corners are displaced outwardly it will exactly conform to the contour of the prism-like cavity in mold 46, thereby ensuring that filled containers of the desired configuration will be formed.

Since the corners of the filled containers C' have not been stretched in the formation thereof, they will be of substantially the same thickness as the original film of thermoplastic material and hence will not break down when subjected to abrasion in normal handling or packaging.

It is also to be noted that the thickness of the belt 14 actually forms part of the molds 45 and 46 for the web is stretched through the aperture 17 in the belt into the mold cavities. Once the initial cavity C is formed by the mold 45, since its periphery or frame-like area is supported by the belt, when the latter has advanced the web cavity, it will be moved without relative movement with respect to the belt, and when the aperture 17 in the belt in which the initial cavity C is positioned, is moved into alignment with the cavity in mold 46, the web cavity C will also be exactly aligned with the cavity in mold 46 to ensure that it will conform exactly to the contour of such mold cavity.

Means are provided to cover the mouth of the filled container C' formed by the equipment thus far described.

To this end, as shown in Figs. 1 and 6, a pair of vertically aligned horizontal rollers 81, 82 are provided, straddling the belt 14 and extending transversely across the latter, at least one of said rollers being driven.

As shown in Fig. 6, the roller 82 has a pair of annular recesses 83 therein defining annular pressure portions 84 aligned with the strips 20, 21, 22 of the belt 14, to provide clearance for the filled cavity C' formed in the web 25.

A web 85 of thermoplastic material from which the cover is formed, is fed from suitable supply roll (not shown) between the rollers 81, 82 to be advanced thereby, said web being positioned on top of the web 25 in which the container cavities C' have been formed and filled.

Means are provided to heat the portions of the webs 25 and 85 extending laterally of the mouth of each of the filled container cavities C'. To this end, as shown in Figs. 1A and 7, a heating and sealing unit 86 is provided comprising a plate 87 suitably mounted so that it may be vertically reciprocated by a plunger 88.

The plate 87 which extends transversely across the belt 14, carries suitable heating elements 89 and has a depending rib 91 extending along the rear edge thereof which is slightly convex as at 93 and is adapted to be aligned with the transverse strips 23 of the belt 14, and depending parallel ribs 92 extending longitudinally of the belt and aligned with the longitudinal strips 20, 21 and 22 of the belt 14.

Thus when the belt 14 in its step by step advance, moves the filled container cavity C' with the cover web 85 thereon beneath the sealing unit 86, with the ribs 91, 92 thereof in vertical alignment with one of the transverse strips 23 and the longitudinal strips 20, 21, 22 of the belt, the latter will stop and the heating unit is moved downwardly to bring its ribs 91 and 92 into engagement with the webs 25 and 85.

To ensure dependable sealing action, as shown in Figs. 1A and 7, a plurality of parallel backing rails 95 are provided aligned respectively with the strips 20, 21, 22 of the belt 14 and positioned beneath the latter, said rails being mounted on a suitable support 96 and positioned beneath the heating unit 86.

Thus when the heating unit 86 is moved downwardly its ribs 91, 92 will seal together the juxtaposed portions of webs 25, 85 which define a frame-like area around the filled cavity C' in the web 25.

It is to be noted that there is only a sealing rib 91 at the rear edge of plate 87. This is to avoid two heat sealings of the transverse portion of the frame-like area of the webs 25, 85, the sealing rib 91 acting on successive transverse portions as the belt advances in its step by step movements. The concave portions 93 of the sealing rib 91 ensure positive engagement with the portions of the webs 25, 85 spanning the strips 20, 21, 22, as such web portions may bow slightly.

Means are provided to sever and intermittently slit the heat sealed portions of the webs 25 and 85.

To this end to sever the heat sealed portions extending transversely between transversely aligned pairs of filled container cavities C' and to intermittently slit the heat sealed portion extending longitudinally between said transversely aligned pairs of containers as shown in Fig. 8, the severing and slitting means 97 and 98 shown in Fig. 1A are provided.

The severing means 97 comprises a continuous cutting blade 99 suitably mounted on a reciprocable plunger 101 and extending transversely across the belt 14. The slitting means 98 comprises an interrupted slitting blade 102 suitably mounted on a reciprocable plunger 103 and extending longitudinally of the belt 14 aligned with the central strip 22 thereof.

To ensure dependable severing and slitting action, the backing rails 95 also extend beneath the severing and slitting blades 99 and 102 and in addition an additional backing rail 100 controlled by a reciprocable plunger 104, extends between pairs of the rails 95 to be moved upwardly into juxtaposition with the portions of the webs 25, 85 extending transversely between the transversely aligned filled container cavities.

Thus, as the webs 25, 85 are advanced with step by step movement of the belt 14, when such belt is at rest, the plungers 101 and 103 will be moved downwardly and the plunger 104 will be moved upwardly to provide dependable severing and slitting action.

As a result groups of pairs of filled containers transversely aligned with respect to the web will be formed, slit as at 105 between their adjacent ends as shown in Figs. 8 and 9.

If desired, the blade 102 can be a continuous severing blade; the severing blade 99 can be reciprocated to act upon alternate transverse portions of the webs and an additional interrupted slitting blade can be provided to act upon alternate transverse portions of the web. Such arrangement would provide groups of pairs of filled containers longitudinally aligned with respect to the web and intermittently slit as at 106 between their adjacent sides as shown in Figs. 10, 11 and 12.

It is also within the scope of the invention to sever and slit the webs in the manner shown in Fig. 10A. Thus the blade 102 can be a continuous severing blade; the severing blade 99 can be reciprocated to act upon every fourth transverse portion of the webs and an additional interrupted slitting blade can be provided to act upon the three transverse portions of the webs between the adjacent severed portions thereof.

Such arrangement would provide two rows each having groups of four filled containers longitudinally aligned with respect to the web; and intermittently slit as at 106' between their adjacent sides as shown in Fig. 10A.

Means are provided to remove from the belt 14, the filled containers severed and slit as above described.

To this end as shown in Fig. 1A, a plate 109 is provided positioned beneath the belt 14 and mounted on a reciprocable plunger 111. Mounted on the plate 109 are spaced elongated blocks 112 of dimensions such that they may move through the apertures 17 in the belt 14, each of the blocks 112 having a cavity 113 in which the lower central portion of the filled container may seat.

Thus when the belt 14 is at rest, the plate 109 is moved upwardly to move the blocks 112 thereon through the apertures 17 in the belt 14, thereby to lift the filled containers clear of such belt into juxtaposition with a suction head 114. The suction head 114 will thus hold the filled containers above and clear of the belt and in any suitable manner may be moved laterally, for example, to deposit the filled containers on a suitable discharge conveyor and then is restored to its ready position over the plate 109.

The filled container cavities when in end to end relation, as shown in broken lines in Fig. 9, may be pivoted together as shown in full lines to form a package that is substantially square in cross section and comprising two filled containers.

When the filled containers are in side by side relation, as shown in broken lines in Fig. 11, they may be pivoted together as shown in full lines to form a triangle and as the outer surface of the cover web 85 is accessible to view and not stretched when applied, it may have been previously printed with suitable indicia. If desired two of such triangles may be placed into juxtaposition to form a package that is square in cross section comprising four filled containers.

In such side by side relation, the filled containers may be pivoted together as shown in full lines in Fig. 12 also to form a package that is substantially square in cross section comprising two filled containers.

With the groups of four filled containers in side by side relation as shown in Fig. 10A, they may be pivoted together to form a package that is square in cross section comprising four filled containers.

Where the containers are to be filled with soap powder, detergents or the like, each containing a measured charge of such material, and which are to be introduced without opening, into a dish-washer or washing machine, the thermoplastic webs 25, 85 could be a film of any suitable water-soluble material.

Although films of such water-soluble material are relatively fragile, by reason of the fact that the corners of the filled containers are substantially unstretched and substantially the same thickness as the remaining portions of the container they are not likely to be damaged or punctured at such corners by ordinary shipping and handling.

As many changes could be made in the above method and equipment, and many apparent widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. The method of providing a container cavity to receive material to be packaged, which comprises supporting a rectangular frame-like area of a film of stretchable material, forming from the film within the region defined by the frame-like area, an initial cavity having re-entrant reversible corners, the apices of which extend towards the plane of the frame-like area, and thereupon while still supporting the frame-like area of the film, and without relative movement between said frame-like area and its support, reversing said corners by displacing the latter away from the plane of the frame-like area to form the container cavity.

2. The method set forth in claim 1 in which the film is of thermoplastic material and is heated for softening thereof prior to being formed into such initial cavity.

3. The method set forth in claim 1 in which suction is applied to form the initial cavity with the re-entrant reversible corners.

4. The method set forth in claim 1 in which the corners are displaced away from the frame-like area by filling of the initial cavity with the material to be packaged.

5. The method set forth in claim 1 in which the film is placed into juxtaposition with a mold cavity of configuration complementary to that of the initial cavity to be formed and suction is applied to draw the region of the film within the frame-like area thereof into such mold cavity to form the initial cavity.

6. Apparatus for forming containers comprising a frame having an aperture, means for applying a web of stretchable material over said frame to span the aperture therein, a mold positioned beneath said frame and having a cavity therein with outward extensions corresponding in location to corner portions of a container to be formed, said extensions being mirror images of said corners, means to move the region of the film spanning the aperture in the frame into said mold to form an initial cavity in the web that conforms to the contour of the mold cavity, while retaining the frame-like area of said web around the periphery of said frame aperture against said periphery, a second mold positioned beneath said frame and having a cavity therein and of greater volume than said first mold cavity, means to release said web cavity from said first mold and to align the frame aperture with its associated initial web cavity with said second mold, while maintaining the periphery of the initial cavity in said web against the periphery of said frame aperture, and means to conform the initial web cavity to the contour of the second mold cavity.

7. The combination set forth in claim 6 in which an endless belt is provided having a plurality of successive apertures, the portion of said belt around the periphery of each aperture defining the frame of each aperture.

8. The combination set forth in claim 6 in which the means to conform the web cavity to the contour of the second mold cavity, comprises a filling member, means to effect relative movement between the frame and the filling member to bring said frame aperture with its associated initial web cavity and said filling member into alignment, whereby upon discharge of material from said filling member into the initial web cavity, the latter will be conformed to the contour of said second mold cavity.

9. The combination set forth in claim 8 in which means are provided to apply a cover web over said filled container cavity and to seal the frame-like area of the web in which the cavity is formed to the corresponding portion of the cover web.

10. The combination set forth in claim 6 in which an endless belt is provided having a plurality of successive apertures, the portion of said belt around the periphery of each aperture defining the frame of each aperture, and means are provided to effect step by step advance of said belt successively to bring the apertures therein into alignment with said first and second molds.

11. The combination set forth in claim 6 in which an endless belt is provided having a plurality of successive apertures, the portion of said belt around the periphery of each aperture defining the frame of each aperture, and means are provided to effect step by step advance of said belt successively to bring the apertures therein into alignment with said first and second molds, means to apply a cover web over said filled container cavity and to seal the frame-like area of the web in which the cavity is formed to the corresponding portion of the cover web and means to sever said webs to separate said filled container cavities, said belt advancing said webs to said severing means.

12. The combination set forth in claim 11 in which means are provided to move the separated filled containers out of the apertures in said belt.

13. The combination set forth in claim 6 in which the web is of thermoplastic material.

References Cited in the file of this patent
UNITED STATES PATENTS

| Number | Name | Date |
|---|---|---|
| Re. 23,171 | Boikland | Nov. 29, 1949 |
| 2,230,189 | Feingren | Jan. 28, 1941 |
| 2,736,150 | Loeu | Feb. 28, 1956 |